(12) United States Patent
Cohen et al.

(10) Patent No.: US 7,701,730 B2
(45) Date of Patent: *Apr. 20, 2010

(54) METHOD AND APPARATUS FOR POWER CONVERTERS HAVING PHASES SPACED AT DESIRED PHASE ANGLES

(75) Inventors: Isaac Cohen, Dix Hills, NY (US); Robert A. Neidorff, Bedford, NH (US); Richard L. Valley, Nashua, NH (US)

(73) Assignee: Texas Instruments Incorporated, Dallas, TX (US)

( * ) Notice: Subject to any disclaimer, the term of this patent is extended or adjusted under 35 U.S.C. 154(b) by 517 days.

This patent is subject to a terminal disclaimer.

(21) Appl. No.: 11/708,820

(22) Filed: Feb. 21, 2007

(65) Prior Publication Data

US 2007/0253224 A1    Nov. 1, 2007

Related U.S. Application Data

(60) Provisional application No. 60/796,420, filed on May 1, 2006.

(51) Int. Cl.
*H02K 47/22* (2006.01)
(52) U.S. Cl. .......................................... 363/9
(58) Field of Classification Search ................ 323/222, 323/234, 237, 271, 272, 282, 284, 299; 363/9; 331/2, 14, 16, 34, 45, 57
See application file for complete search history.

(56) References Cited

U.S. PATENT DOCUMENTS

| | | | |
|---|---|---|---|
| 4,511,956 A * | 4/1985 | Dewan et al. ................ 363/49 |
| 5,793,191 A | 8/1998 | Elmore et al. | |
| 6,495,995 B2 * | 12/2002 | Groom et al. ................ 323/283 |
| 6,750,637 B2 * | 6/2004 | Nagaki et al. ................ 323/272 |
| 6,806,689 B2 * | 10/2004 | Schuellein et al. .......... 323/272 |
| 6,979,980 B1 * | 12/2005 | Hesterman et al. .......... 323/222 |
| 6,995,548 B2 * | 2/2006 | Walters et al. ............... 323/272 |
| 7,053,713 B1 * | 5/2006 | Dening ........................ 330/276 |
| 7,138,789 B2 * | 11/2006 | Moussaoui et al. .......... 323/272 |
| 7,173,400 B2 * | 2/2007 | Morioka ...................... 323/266 |
| 7,199,622 B2 * | 4/2007 | Chang et al. ................. 327/100 |
| 7,265,522 B2 * | 9/2007 | Sutardja et al. .............. 323/222 |
| 7,301,400 B1 * | 11/2007 | Dening ........................ 330/276 |
| 7,342,386 B2 * | 3/2008 | Wildash ...................... 323/272 |
| 7,504,808 B2 * | 3/2009 | Schrom et al. ............... 323/272 |
| 2007/0253224 A1 * | 11/2007 | Cohen et al. .................... 363/9 |
| 2007/0262823 A1 * | 11/2007 | Cohen et al. .................. 331/45 |

* cited by examiner

*Primary Examiner*—Adolf Berhane
*Assistant Examiner*—Yemane Mehari
(74) *Attorney, Agent, or Firm*—John J. Patti; Wade J. Brady, III; Frederick J. Telecky, Jr.

(57) ABSTRACT

A system and method for power conversion synchronizes multiple phases at a desired phase angle difference. The power conversion involves variable frequency switching, fixed on-time and provides power factor correction. A relative measure of a phase angle difference between two phases permits each phase to be controlled to obtain the desired phase angle difference. The power conversion involves transition mode switching to help reduce switching losses. A phase angle difference detector may be provided for each phase. The various phases may have different inherent frequencies that vary with switching frequency, and are synchronized to an average frequency.

34 Claims, 7 Drawing Sheets

METHOD AND APPARATUS FOR POWER CONVERTERS HAVING PHASES SPACED AT DESIRED PHASE ANGLES

CROSS REFERENCE TO RELATED APPLICATIONS

This application claims benefit of U.S. Provisional Application No. 60/796,420, filed May 1, 2006. This application is related to U.S. application Ser. No. 11/799,352 filed May 1, 2007, U.S. application Ser. No. 11/799,181 filed May 1, 2007, and U.S. application Ser. No. 11/799,190 filed May 1, 2007.

STATEMENT REGARDING FEDERALLY SPONSORED RESEARCH OR DEVELOPMENT

Not Applicable

BACKGROUND OF THE INVENTION

1. Technical Field of the Invention

The present invention relates generally to multiple power converters used in conjunction, and relates more particularly to power converters used in conjunction with interleaved phases.

2. Description of Related Art

Performance improvements in interleaved, multiphase power supplies result from advantages such as reduced input current ripple, reduced peak output current and higher frequency output ripple current, the output ripple being thus easier to filter. A particular type of switching power supply has a variable switching frequency to obtain desired power supply output characteristics based on input power. Due to the variable frequency nature of the power supply switching, it can be challenging to synchronize the various phases to obtain one or more of the above-described advantages.

Obtaining high efficiency in switching power supplies is also challenging, and can be improved with multiple interleaved phases when properly synchronized. Another aspect for improving efficiency of switching power supplies is to achieve zero voltage switching and zero current switching, so that switching losses can be reduced, especially at high frequencies. Various types of switching modes are employed in switching power supplies to achieve desired output characteristics. For example, a switching power supply may operate in continuous, discontinuous or transition mode, depending on the desired operating characteristics for the power supply. One advantage to transition mode operation is the potential for zero voltage and/or zero current switching in the power supply.

Transition mode operation can also contribute to improving the power supply power factor by keeping the input voltage in phase with the input current. However, the variable frequency nature of the switching power supply makes synchronization of the various power phases somewhat challenging as frequency changes to deliver desired output power characteristics. It is desirable to properly align the phases of an interleaved power supply to obtain the advantages of a properly synchronized multiphase interleaved power supply. For example, if a multiphase interleaved power supply has two phases, the waveforms of the phases should be 180° apart. For a three-phase interleaved power supply, the waveforms of the phases should be maintained 120° apart. In general, the phase angle separation is equal to 360°/N, where N is the number of phases in the interleaved power supply.

One way to correct for mismatch in phase separation is to employ a Phase Locked Loop (PLL) to maintain an appropriate phase angle separation. Such a concept is illustrated in U.S. Pat. No. 5,793,191, where a slave stage of a power converter is maintained 180° out of phase with a master power converter stage. One drawback to this approach is the challenge of acquiring and maintaining a phase lock over a wide range of conditions. The PLL capture range must encompass the difference between the free-running frequencies of the master and slave(s), which may prove difficult or costly in practice.

SUMMARY OF THE INVENTION

Briefly stated, the present disclosure provides a system and method for power conversion that synchronizes multiple phases at a desired phase angle difference. The power conversion involves variable frequency switching, fixed on-time and provides power factor correction. A relative measure of a phase angle difference between two phases permits each phase to be controlled to obtain the desired phase angle difference. The power conversion involves transition mode switching to help reduce switching losses. A phase angle difference detector may be provided for each phase. The various phases may have different inherent frequencies that vary with switching frequency, and are synchronized to an average frequency.

According to one embodiment, the disclosure provides a power converter with two interleaved phases having periodic waveforms. The converter may include one or more waveform generators to control generation of the periodic waveforms. In addition, a phase detector is coupled to one or more of the waveform generators to generate an indication of a phase angle difference between the periodic waveforms. The waveform generator is responsive to the indication to control the generation of both periodic waveforms to form a desired phase angle difference between the periodic waveforms.

The power converter may have another phase detector coupled to a waveform generator to generate another indication of another phase angle difference. The waveform generator is responsive to one indication to control generation of one of the periodic waveforms and is responsive to the other indication to control generation of another periodic waveform. The waveform generator causes the desired phase angle difference to be formed based on a relative relationship between the periodic waveforms. According to one exemplary aspect of the disclosed concept, the indication of the phase angle difference contributes to proportioning a rise or fall time of a corresponding periodic waveform.

Two or more waveform generators may be used to generate the periodic waveforms. Each waveform generator is responsive to a separate indication of a relative phase angle difference between periodic waveforms of different phases. The relative phase angle difference is a differential measure between cycles of periodic waveforms of different phases, as measured from one phase to the other, using either phase as the starting point. The relative phase angle difference can thus be a measure from a first phase to another, a measure from another phase to the first, or both. The use of both relative measures provides additional control freedoms to help speed the relative synchronization of the phases at a desired phase angle difference. The phase angle difference may be determined, for example, by measuring a time interval between cycle start points of the periodic waveforms of two different phases.

The relative phase angle difference can be a measure between two different phases that are not necessarily consecutively ordered in time. For example, the differential measure between cycles may be drawn between phases 2 and 5 in a six phase system, or between any combination of phases. The relative phase angle difference simply offers a relative measure between two of the phases, taken from the perspective of either phase, to contribute controlling the respective periodic waveforms to have a desired phase angle difference.

The one or more waveform generators can each be operated to obtain a power factor correction (PFC) in each phase by controlling the generation of each of the respective periodic waveforms, while operating with variable switching frequency. The power conversion can be achieved with different operational modes, including transition, continuous and discontinuous modes.

The phase detector may include a device used to measure an interval between cycles of periodic waveforms of different phases. For example, a capacitor, counter or timer may be provided in the phase detector to contribute to producing the indication of phase angle difference.

A feedback signal representative of the periodic waveform in a phase may be provided to a respective waveform generator to contribute to controlling generation of the periodic waveforms. The feedback signal may indicate, for example, when a switching event should occur to achieve desired parameters such as output voltage, current or power levels.

According to another exemplary embodiment, the disclosure provides a power converter with a plurality of interleaved phases having periodic waveforms that are synchronized. The converter includes one or more waveform generators that provide periodic signals used to generate the periodic waveforms. One or more phase detectors coupled to the waveform generator(s) provide an indication of a relative time interval between cycles of two of the periodic signals provided by the waveform generator(s). The waveform generator(s) is(are) responsive to the indication to modify the periodic signals to control or modify the generation of the periodic waveforms such that the periodic waveforms have a desired phase angle difference.

According to another exemplary embodiment of the present disclosure, a method of power conversion involving a power converter that has a plurality of interleaved phases synchronizes the periodic waveforms in the phases to a desired phase angle difference. The method includes generating a plurality of periodic signals to form the periodic waveforms. An indication of a relative time interval between cycles of at least two of the periodic signals that are each associated with a different phase is obtained. Based on the indication, the at least two periodic signals are controlled or changed to modify the generation of the periodic waveforms such that the periodic waveforms have a desired phase angle difference.

According to another exemplary embodiment, the present disclosure provides a power converter with a first and a second waveform generator to generate a first and a second periodic waveform representative of a first and a second phase. A first and a second phase detector are coupled to the first and second waveform generators, respectively, and provide a first and a second indication of a relative time interval between a cycle of a respective periodic waveform and a cycle of another periodic waveform from a different phase. The first and second waveform generators are responsive to the respective first and second indications to influence the generation of the respective first and second periodic waveforms to form a desired phase angle difference between the respective periodic waveforms.

In an embodiment featuring a two-phase power converter, each of the phases is monitored and adjusted with respect to the other phase by sensing the charging and discharging currents in an inductor. Charging and discharging each inductor generates a periodic waveform representing each of the phases. Control of charging and discharging times is responsive to a phase control circuit and a feedback signal for each of the phases. Each of the phases is adjusted by a phase adjuster by advancing or retarding the discharge portion of the waveform representing each of the phases. The phase adjuster influences the feedback signal controlling the shape of the periodic waveform in the corresponding phase, based on information from the other phase. The phase adjuster modifies the shape of the periodic waveform to urge the operating phase difference toward a desired phase difference.

In another embodiment featuring an exemplary three-phase power converter, the phase relationship is controlled based on period information and a phase difference between each of the three phases. Compared to a given phase, another phase is adjusted by an arrangement of a plurality of phase control circuits and a plurality of feedback signals. Each of the plurality of feedback signals is coupled to at least one of the plurality of phase control circuits for influencing a waveform value in the respective phase. The feedback signals help control the shape of the periodic waveforms in the respective phase. A phase adjuster influences the feedback signal to modify the shape of the periodic waveforms, based on phase difference information from another of the plurality of phase control circuits, to urge the operating phase difference toward a desired phase difference.

The three-phase power converter can be modified to process more than three phases with relatively simple modifications.

BRIEF DESCRIPTION OF THE SEVERAL VIEWS OF THE DRAWINGS

Further aspects of the invention will be apparent upon consideration of the following detailed description, taken in conjunction with the accompanying drawings, in which like reference characters refer to like parts throughout, and in which.

DETAILED DESCRIPTION OF THE INVENTION

This application claims the benefit of U.S. Provisional Application No. 60/796,420, filed May 1, 2006, the entire content of which is hereby incorporated herein by reference.

Figure 1:
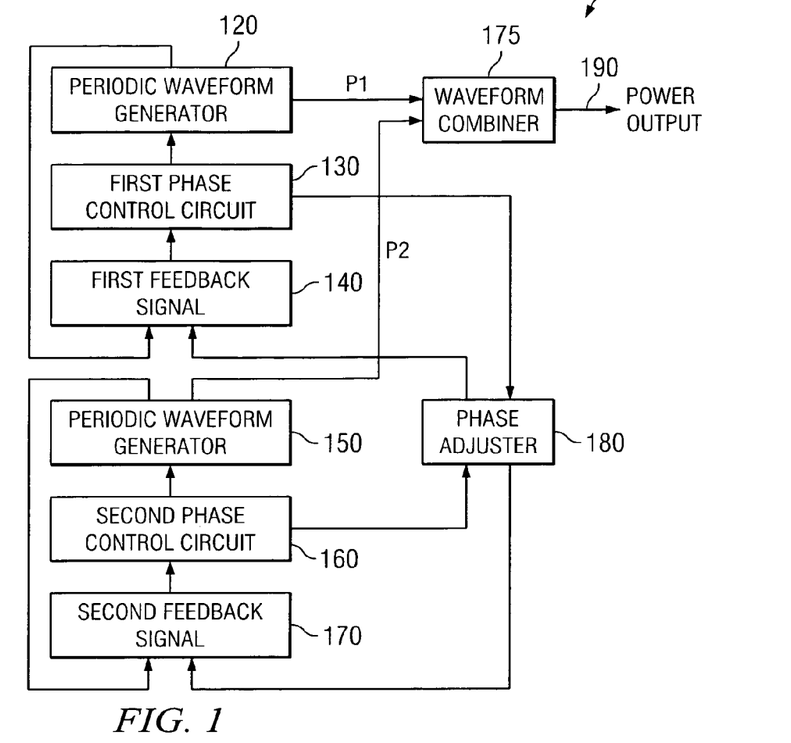
FIG. 1 is a block diagram of a two-phase power converter according to an embodiment of the present invention.

FIG. 1 is a block diagram of a power converter 100 according to an embodiment of the present invention. For a first phase P1, a periodic waveform generator 120 is coupled to a first phase control circuit 130. A first feedback signal 140 is coupled to the first phase control circuit 130. The first feedback signal 140 influences a shape of the periodic waveform provided by generator 120. Similarly, for a second phase P2, a periodic waveform generator 150 is coupled to a second phase control circuit 160. A second feedback signal 170 is coupled to the second phase control circuit 160. The second feedback signal 170 influences a shape of the periodic waveform provided by generator 150.

A phase adjuster 180 is connected to the first phase control circuit 130 and the second phase control circuit 160. The phase adjuster 180 influences the first feedback signal 140 and the second feedback signal 170. The phase adjuster 180 contributes to controlling the shape of the periodic waveform provided by generator 120 in the corresponding phase P1, based on information from the second phase control circuit 160, and helps modify the shape of the periodic waveform from generator 120 to urge the operating phase difference toward a desired phase difference. Simultaneously, the phase adjuster 180 contributes to controlling the shape of the periodic waveform 150 in the corresponding phase P2, based on information from the first phase control circuit 130, and helps modify the shape of the periodic waveform from generator 150 to urge the operating phase difference toward a desired phase difference. Phases P1 and P2 are input to a waveform combiner 175 to achieve a power output 190. The waveform combiner 175 may be a rectifier including an arrangement of diodes.

The operating phase difference and the desired phase difference may each be in a range of 0° through 180°. The power converter 100 may include an accumulator or timer, such as a capacitor in phase adjuster 180 to measure the operating phase difference. Similarly, the power converter 100 may include a counter in phase adjuster 180 to measure the operating phase difference. Each of phases P1 and P2 in the power converter 100 may include an inductor-based boost power supply or converter.

In order to ensure an operation at a predetermined degree of stability, the power converter 100 may locate at least one of a pole and zero related to at least one of the first and second feedback signals. The power converter 100 may include with the phase adjuster 180 various timing signals to contribute to maintaining a certain phase relationship, such as having phase P1 lead phase P2. In an exemplary embodiment, there is provided an adjustable time delay to avoid having a latch operated in an undesired state.

The power converter 100 may include with the phase adjuster 180 a reference, such as a reference voltage, that has a value that is related to the number of phases. The reference value contributes to determining the appropriate amount of control adjustment provided to first and second feedback signals 140, 170. According to an exemplary embodiment, the reference is a voltage value derived from the relationship $(n-1)/n$, where n is the number of phases. The phase adjuster 180 may include an output having a ripple-lowering network, such as an RC (resistor-capacitor) network. The periodic waveforms provided by generators 120, 150 may be obtained by operation of a plurality of inductors. Because of the architecture of power converter 100, the inductors tolerances may be broadened to less expensive component selection and reduced overall costs. As a back-up measure to start the functioning of the power converter 100, the power converter 100 may include a restart timer.

To control waveform rise and fall times, and thus waveform period, as may be provided by employing a reactive component, such as an inductor, the power converter 100 manipulates the feedback signals 140, 170 to proportion a rise and fall time, e.g., a charge duration and a discharge duration, of one or more of the periodic waveforms. The proportions of the charge and discharge durations impact the waveform period. More specifically, phase adjuster 180 modifies feedback signals 140, 170 to cause respective phase control circuits 130, 170 to vary a waveform period to advance or retard the respective phase. Phase adjuster 180 determines the modification of feedback signals 140, 170 based on a relative measure of a phase difference between phases P1 and P2, as indicated by the control signals supplied by control circuits 130,160. The relative measure may be taken from the start of a cycle in each of the phases P1 and P2, or any other corresponding points between the cycles. This modification may be based on a duration between a first instant having one of a zero slope and a discontinuity and a second instant having one of a zero slope and a discontinuity of the other periodic waveform. A zero slope may be found in a continuous waveform and a discontinuity may be found in a non-periodic or discontinuous waveform.

Figure 2:
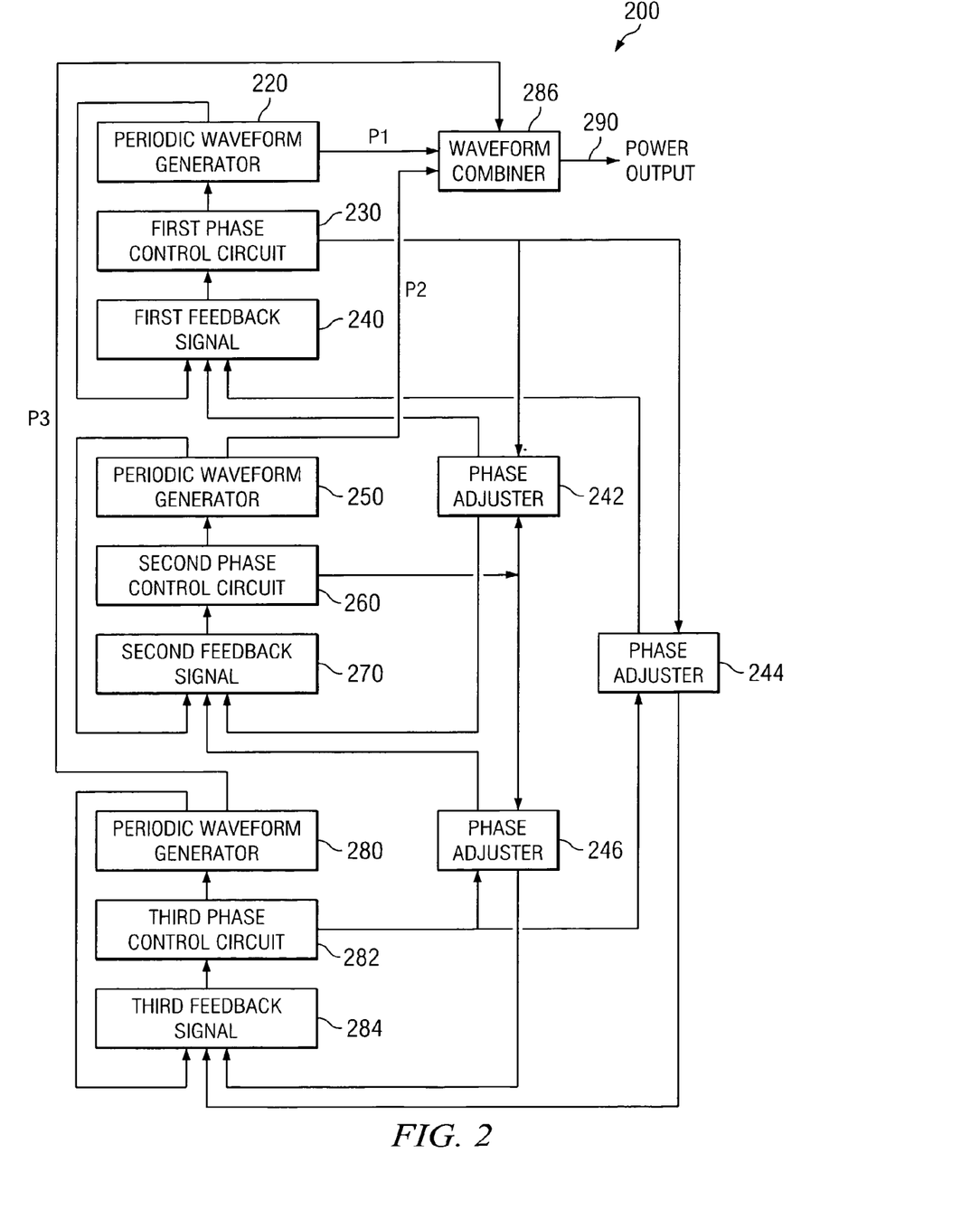
FIG. 2 is a block diagram of a three-phase power converter according to another embodiment of the present invention.

FIG. 2 is a block diagram of a power converter 200 according to another embodiment of the present invention. A periodic waveform generator 220, a first phase control circuit 230 and a first feedback signal 240 are configured with respect to each other, to generate phase P1, in a manner similar to that described for FIG. 1. Similarly, a periodic waveform generator 250, a second phase control circuit 260 and a second feedback signal 270 are configured with respect to each other to generate phase P2. To generate phase P3, a periodic waveform generator 280, a third phase control circuit 282 and a third feedback signal 284 are configured with respect to each other.

Since power converter 200 features three phase angle differences to measure, FIG. 2 shows three phase adjusters, viz., phase adjusters 242, 244 and 246. Phase adjuster 242 is connected to the first and the second phase control circuits 230, 260 and the first and second feedback signals 240, 270. Phase adjuster 244 is connected to the first and the third phase control circuits 230, 282 and the first and third feedback signals 240, 284. Phase adjuster 246 is connected to the second and the third phase control circuits 260, 282 and the second and third feedback signals 270, 284. Phases P1, P2 and P3 are input to a waveform combiner 286 to achieve a power output 290. The waveform combiner 286 may be a rectifier formed as an arrangement of diodes.

The operating phase difference and the desired phase difference may each be in a range of 0° through 120°. The power converter 200 may include a timer or an accumulator, such as a capacitor to measure the operating phase difference and the desired phase difference. Similarly, the power converter 200 may include a counter to measure the operating phase difference and the desired phase difference. The power converter 200 may include an inductor-based boost power supply.

In order to ensure an operation at a predetermined degree of stability, the power converter 200 may locate poles or zeroes related to the one or more feedback signals. The power converter 200 may include with the phase adjusters 242,244,246 an input having an adjustable time delay so that a latch does not operate in an undesired state.

The power converter 200 may include with the phase adjusters 242, 244, 246 a reference, such as a reference voltage, that has a value that is related to the number of phases. The reference value contributes to determining the appropriate amount of control adjustment provided to first, second and third feedback signals 240, 270 and 284. According to an exemplary embodiment, the reference is a voltage value derived from the relationship $(n-1)/n$, where n is the number of phases. The phase adjusters 242, 244, 246 may include an output having a ripple-lowering network, such as an RC (resistor-capacitor) network. As a back-up measure to start the functioning of the power converter 200, the power converter 200 may include a restart timer.

To control waveform rise and fall times, and thus waveform period, as may be produced by employing a reactive component, such as a capacitor, the power converter 200 manipulates the feedback signal to proportion a rise and fall time, implemented as a charge duration and a discharge duration, of one of the periodic waveforms. This proportioning may be based on a relative measure of the phase difference between each of the phases P1, P2 and P3 as indicated by the control signals supplied by control circuits 230, 260 and 282. The relative measure may be taken from the start of a cycle in each of the phases P1, P2 and P3, or any other corresponding point that is consistent between the phases. The proportioning may be based on a duration between a first instant having one of a zero slope and a discontinuity in one phase and a second instant having one of a zero slope and a discontinuity of another phase. A zero slope may be found in a continuous waveform and a discontinuity may be found in a non-periodic or discontinuous waveform.

Figure 3:
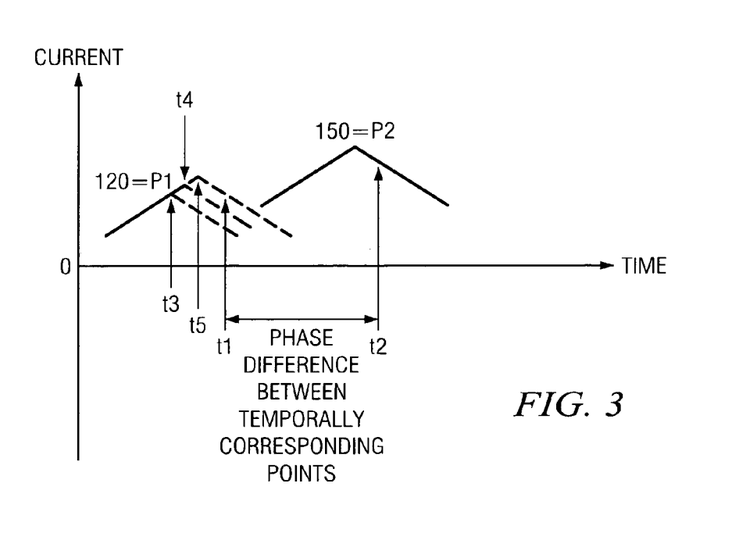
FIG. 3 illustrates a phase relationship between phases P1 and P2.

FIG. 3 illustrates a phase relationship between phases P1 and P2. Specifically, a point (t1) of the first periodic waveform 120 is spaced apart from a temporally corresponding or magnitude related point (t2) of the second periodic waveform 150 by a predetermined phase angle. Point t4 is a point illustrating a peak of phase P1 marking the beginning of a discharge portion of a cycle involving a reactive component, such as an inductor, which helps generate phase P1. If the charge time of the reactive component of phase P1 is shortened, or the component is permitted to discharge sooner, the peak of periodic waveform 120 moves to. t3. Similarly, if the charge time of the reactive component of phase P1 is lengthened, or the component is permitted to discharge after a longer time, the peak of periodic waveform 120 moves to t5. Keeping in mind the relationship between t1 and t2, it can be seen that by controlling the instant for commencement of the discharge of the reactive component of phase P1, a period of phase P1, and thus a phase difference between phases P1 and P2, can be modified. A similar result would be obtained if the commencement of the discharge portion of the cycle were altered for a reactive component helping generate phase P2.

Figure 4:
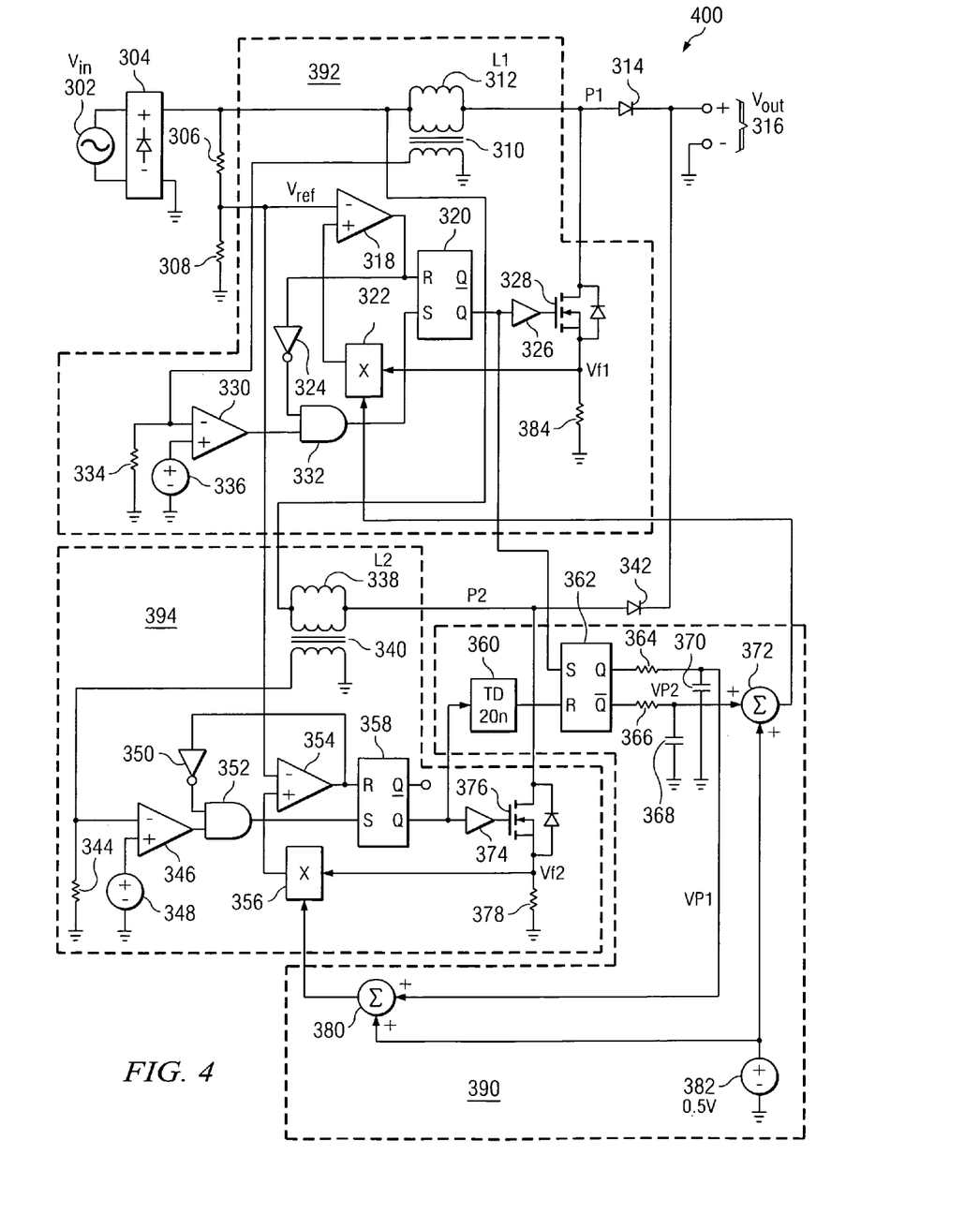
FIG. 4 illustrates an exemplary circuit diagram of the two-phase power converter according to another embodiment of the present invention.

FIG. 4 shows a two-phase, variable frequency interleaved power converter 400. While power converter 400 operates in transition mode, it should be apparent that other modes, including continuous and discontinuous, may be used. The power converter 400 includes AC voltage source 302, rectifier module 304, resistors 306 and 308, diodes 314 and 342, DC voltage output 316 and blocks 392 for phase P1, 394 for phase P2, and a phase detector 390 for feedback and phase control.

Block 392 includes inductor 312 (L1), voltage transformer 310, comparator 318, inverter 324, multiplier 322, AND gate 332, comparator 330, resistors 334 and 384, reference voltage source 336, SR latch 320, on-off switch controller 326, and FET (n-channel)-based switch 328. Voltage $V_{f1}$ is generated at the junction of resistor 384 and switch 328.

Block 394 includes inductor 338 (L2), voltage transformer 340, comparator 354, inverter 350, multiplier 356, AND gate 352, comparator 346, resistors 344 and 378, reference voltage source 348, SR latch 358, on-off switch controller 374, and FET (n-channel)-based switch 376. Voltage $V_{f2}$ is generated at the junction of resistor 378 and switch 376.

Phase detector 390 includes a time delay 360 (illustratively shown as 20 nanoseconds), SR latch 362, resistors 364 and 366, capacitors 368 and 370, summers 372 and 380, and constant voltage source 382. Time delay 360 avoids simultaneous highs at the S and R inputs of the SR latch 362.

The two different phases operate by charging and discharging inductors L1 and L2, respectively. The charging part of each cycle for each phase begins when the respective inductor current reaches zero. Voltage transformer 310 provides a sign change indication when the current in inductor L1 reaches zero. The sign change indication is input into comparator 330. A reference voltage 336 is also input into comparator 330, and has a value that corresponds to a practical realization indicating the point at which current through inductor L1 is zero. Reference voltage 336 can be zero, or ground potential. Similarly, voltage transformer 340 provides a voltage indicative of the sign of the current flowing through inductor L2, which voltage is input into comparator 346. Reference voltage 348 provides a value that corresponds to a practical realization value that indicates zero current through inductor L2. Reference voltage 348 can be zero, or ground potential.

As comparators 330 and 346 change state in each respective phase when the current through the corresponding inductor is zero, a new cycle begins in the corresponding phase. Each of phases P1 and P2 operate as separable fixed on-time power converters, so that power converter 400 inherently exhibits a PFC value close to unity. Because each phase begins charging its respective inductor when the inductor current is zero, the power converter 400 operates in transition mode, where each phase is permitted to reach zero current before beginning a new cycle. It should be apparent that power converter 400 may be operated in continuous or discontinuous mode(s) in accord with the present invention. Thus, reference voltages 336 and 348 may be set to any given practical value to achieve a desired switching mode, or may be dynamic. Operation in transition mode offers the possibility of reducing switching losses through zero voltage or zero current switching.

The power converter 400 provides output power based on a desired reference set point, illustrated in FIG. 4 as a node voltage between resistors 306 and 308. The feedback used to control switching, and thus charging and discharging of inductors L1 and L2, is drawn from the voltage across resistors 384 and 378 for phases P1 and P2, respectively. The voltages on resistors 384 and 378 reflect the amount of current flowing through switches 328 and 376, respectively, when the switches are conducting. Switches 328,376 are driven by drivers 326,374. Feedback voltages $V_{f1}$ and $V_{f2}$ contribute to determining when switches 328 and 376 are switched off, or placed in a high impedance state.

To synchronize phases P1 and P2 to obtain a desired phase angle difference, the point at which switches 328 and 376 are turned off is modified for each phase P1 and P2. The modified turn off point depends on the phase difference between phases P1 and P2, as provided by a relative measure. Phase detector 390 provides the relative measure of phase difference between phases P1 and P2. Phase detector 390 also produces control outputs to influence feedback signals $V_{f1}$ and $V_{f2}$ in each of phases P1 and P2. The value of the control outputs provided by phase detector 390 for each phase depends upon a timing indication obtained from the other phase. Accordingly, each of phases P1 and P2 is adjusted by advancing or retarding the discharge portion of the cycle, or proportioning the charge and discharge portions, to maintain a phase difference of 180°.

Phase detector 390 includes SR latch 362, the S and R inputs of which are tied to the switch control signals for switches 328 and 376, respectively. When switch 328 is turned on, the S input to latch 362 is active on the rising edge of the signal, and when switch 376 is turned on, the R input to latch 362 is active on the rising edge. The output state of latch 362 changes with the rising edges of the S and R inputs.

Figure 6:
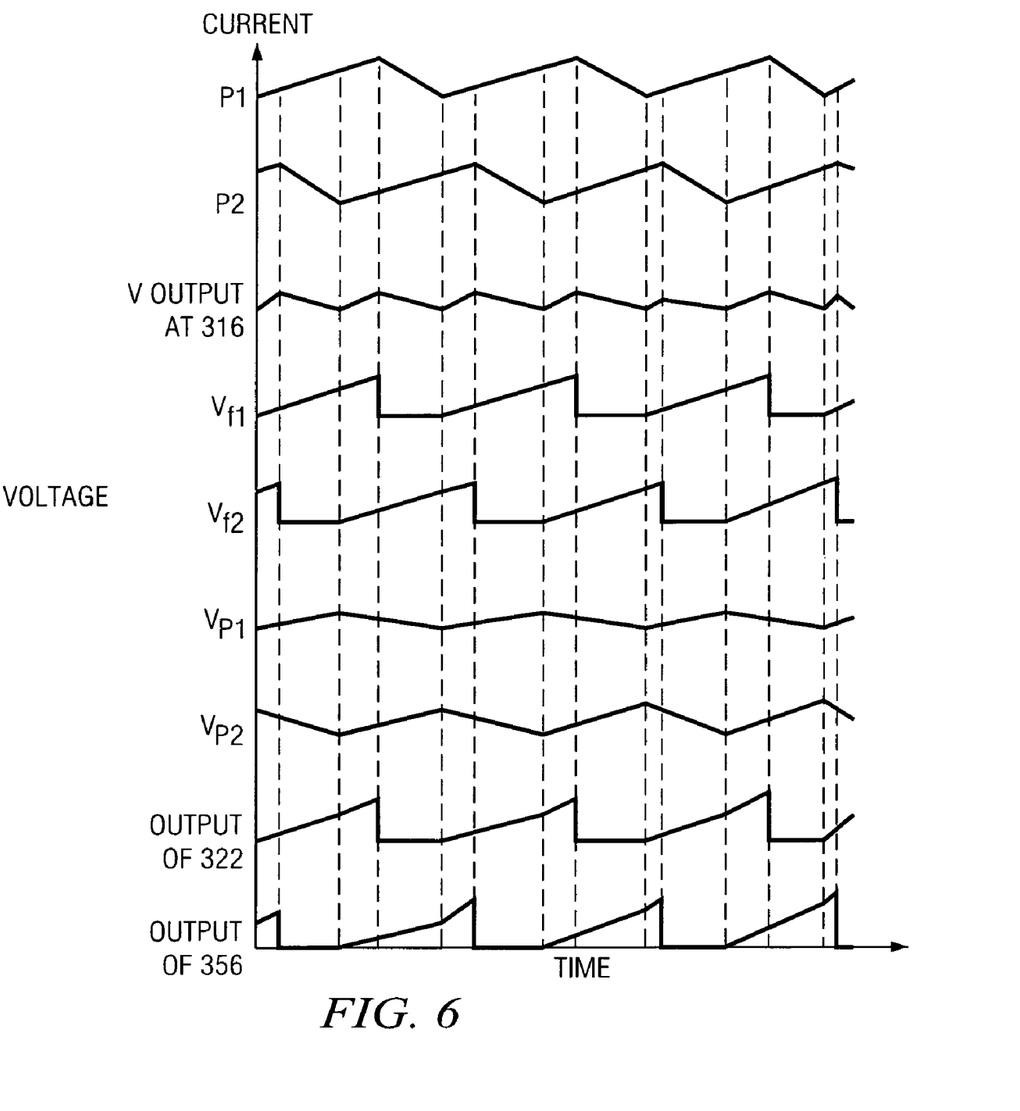
FIG. 6 shows an exemplary timing diagram of the first embodiment of the present invention.

The normal, or non-inverted, output of latch 362 controls charging and discharging of capacitor 370, so that when the normal output state is high, capacitor 370 charges through resistor 364, and when the normal output state is low, capacitor 370 discharges. The same operation occurs for the inverted output of latch 362 with respect to capacitor 368. Voltages $V_{p1}$ and $V_{p2}$ represent the charges placed on capacitors 370 and 368, respectively, during the cycles of each of the different phases P1 and P2. Voltages $V_{p1}$ and $V_{p2}$ have a periodic cycle that reflects the phase angle difference between phase P1 and P2, as shown in FIG. 6. Constant voltage 382 is illustratively set at 0.5V using the relation (n−1)/n. That is, for the case of two phases, n=2 thereby making the constant voltage 382= (2−1)/2=½=0.5V. Voltage $V_{p1}$ is summed with constant voltage 382 at summing junction 380 to produce a multiplier contribution to feedback voltage $V_{f2}$. Voltage $V_{p2}$ is added to constant voltage 382 at summing junction 372 to provide a variable multiplication contribution to feedback voltage $V_{f1}$. Accordingly, the point at which inductors L1 and L2 begin discharging, based on feedback voltages $V_{f1}$ and $V_{f2}$, can be changed by varying the multiplier value supplied by phase detector 390. By shifting the point at which a discharge of inductors L1 and L2 commences, the cycle period of the respective phases changes, thereby changing the relative phase difference between phases P1 and P2.

Operation of phase detector 390 is similar to dual accumulators that add variable values to multiplier values output from summing junctions 372 and 380. The outputs of summing junctions 372 and 380 influence feedback voltages $V_{f1}$ and $V_{f2}$, respectively, to adjust a time at which a discharge portion of a respective phase cycle begins. With respect to phase P1, the charging of capacitor 368, when the inverted output of latch 362 is high, increases the multiplier value applied to feedback voltage $V_{f1}$ by an amount that is related to the phase difference between phases P1 and P2. The inverted output of latch 362 becomes high when a cycle of phase P2 begins, i.e., on the rising edge of the R input, and low when a cycle of phase P1 begins, i.e., on the rising edge of the S input. Accordingly, the output of latch 362 provides a measure of relative phase between phases P1 and P2.

For example, if phase P1 is advanced beyond the 180° phase angle difference desired between phases P1 and P2, the rising edge of the set input does not occur until a later time. Accordingly, the inverted output of latch 362 is high for a longer period of time, which places a larger charge value on capacitor 368. Since the additive value provided to summing junction 372 is increased by the larger charge value, multiplier 322 produces an increased slope output in combination with feedback voltage $V_{f1}$. Since the slope of the output of multiplier 322 is increased, the conditions for commencing a discharge part of a cycle, as seen on the R input of latch 320 to turn off switch 328, are met earlier than that of the previous cycle for phase P1. As the R input to latch 320 becomes active earlier, switch 328 is turned off earlier, or placed in a high impedance state earlier, thereby providing an earlier start point for discharging inductor L1. The earlier commencement of the discharge portion of the cycle of phase P1 tends to shorten the cycle period and retard the phase, thereby bringing the phase difference closer to the desired value of 180°.

In the above example, the slope of the output of multiplier 322 is changed by the increased value supplied by summing junction 372 over a portion or all of a charging part of the cycle for phase P1. Accordingly, the output of multiplier 322 can have multiple slopes, so that it reaches a value for reference voltage $V_{ref}$ at differing times depending upon how the period of the cycle for phase P1 should be varied, thereby varying the phase difference between phases P1 and P2. The control variable used to modify the slope of the output of summing junction 372 is the value added to summing junction 372 by capacitor 368. This value is dependent upon the timing at which the reset input R to latch 362 receives a rising edge signal from the normal output of latch 358. Capacitor 368 begins to discharge at the beginning of a cycle of phase P1, since the output of latch 320 is a high value at that point, providing a rising edge signal to input S of latch 362, which places the inverted output of latch 362 into a low state. The contribution of charging and discharging capacitor 368 to summing junction 372 is the control variable that influences the slope of the output of multiplier 322, based on the value of feedback voltage $V_{f1}$. The change to the slope of the output of multiplier 322 operates to advance or retard the point at which the state of latch 320 is switched to begin a discharge portion of the cycle of phase P1. Alternately, or in addition, the variable slope of the output of multiplier 322 changes the peak of the waveform produced in phase P1, which consequently changes the period of the cycle of phase P1. Viewed another way, the charge and discharge portions of the cycle of phase P1 are proportioned to vary the cycle period and thus the phase angle difference between phases P1 and P2.

Phase P2 is similarly controlled based on the variable additive value provided by capacitor 370 to summing junction 380. The charge placed on capacitor 370 depends upon the state of the normal or non-inverted output of latch 362. Based on a rising edge signal applied to the R input of latch 362, capacitor 370 begins discharging as the charge portion of the cycle of phase P2 begins. The influence of the varying added value $V_{p1}$ supplied to multiplier 356 is related to the phase angle difference between phases P1 and P2. As with the control for phase P1, the output of multiplier 356 applied to the non-inverting input of comparator 354 has a modified slope with a value dependent upon the value of voltage $V_{p1}$. The modified slope of the output of multiplier 356 helps to indicate when the discharge portion of the cycle for phase P2 should begin. The value applied to the non-inverting input of comparator 354 determines the point in the period of the cycle of phase P2 when discharging of inductor L2 begins, by providing a high value to the R input of latch 358, thereby turning off switch 376.

A desired phase angle difference between phases P1 and P2 can be achieved by obtaining a particular duty cycle for the normal and inverted outputs of SR latch 362. For example, with two phases to be separated by a phase angle of 180°, the normal and inverted outputs both have a 50% duty cycle. Another way to view the relationship of the normal and inverted outputs of SR latch 362 is that they are complements of each other. Similarly, the rising edges of inputs S and R are separated by a phase angle of 180° when the waveforms in phases P1 and P2 have a desired phase angle relationship. As another example, the phase detector for a three-phase system has a duty cycle of 33% where the phases are separated by 120°. In the three phase exemplary embodiment where the phase detector is configured as an SR flip flop, the rising edges of the S and R inputs to the SR flip flop are separated by 120° when the waveforms in the three phases have a desired phase angle relationship. These illustrative examples can be extended to the general case, where the duty cycle of a given phase detector 1/n %, where n is the number of phases. Similarly, when the phase detectors are implemented as SR flip flops, the rising edges of the S and R inputs to the SR flip flop are separated by 360°/n, where n is the number of phases, when the waveforms in the phases have a desired phase angle relationship.

With the variable period times of the waveforms in phases P1 and P2 adjusted to obtain a desired relative phase difference between phases P1 and P2, power converter 400 provides low output current ripple, reduced peak input current, and increased output ripple frequency, making the output ripple easier to filter. As the phase difference between phases P1 and P2 is continually adjusted, the frequency of the waveforms in phases P1 and P2 tends to be adjusted toward an average frequency, derived from an initial, potentially differing frequency in each of phases P1 and P2. For example, while the values for inductors L1 an L2 should match, in practice it is difficult to obtain close tolerances on these components without a prohibitively high cost. Consequently, phases P1 and P2 operate at differing frequencies when free running. With the synchronization provided by the concept according to the present invention, phases P1 and P2 can be synchronized to a common, average frequency.

Figure 5:
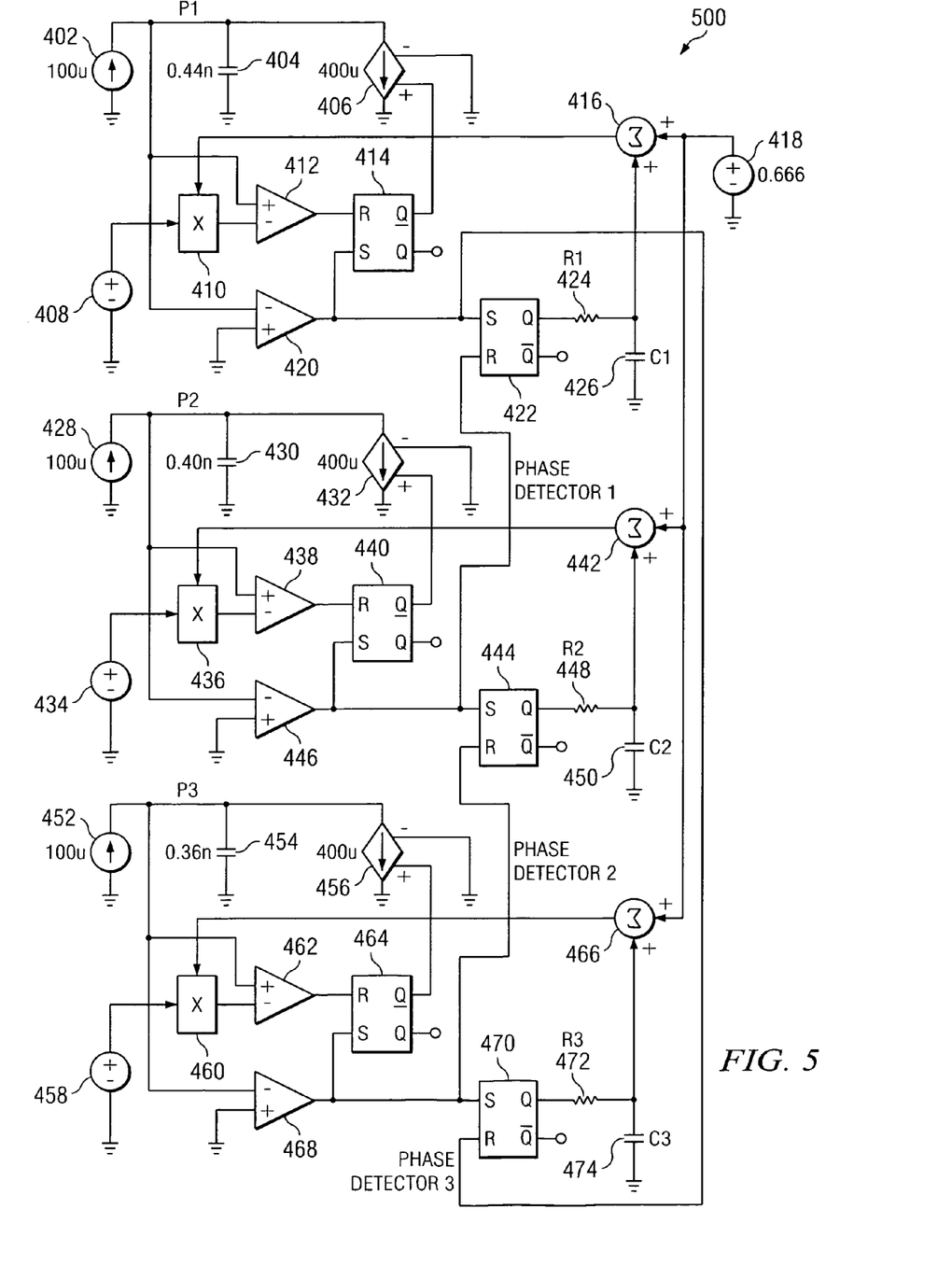
FIG. 5 illustrates an exemplary circuit diagram of the three-phase power converter according to another embodiment of the present invention.

Referring to FIG. 5, a 3-phase embodiment of the present invention is illustrated generally as power converter 500. The diagram for power converter 500 is provided as a more general representation of a 3-phase converter, with each phase being represented by variable frequency oscillators 1, 2 and 3. Although not shown combined together in a single output, each of the waveforms in phases P1, P2 and P3 has a desired phase angle separation of 120° from the waveforms of the other phases to provide phase synchronization.

Each of phases P1, P2 and P3 is controlled to have a desired phase difference with respect to each other with a similar control configuration to that illustrated and described with respect to power converter 400 in FIG. 4. Phase P1 of converter 500 includes a multiplier 410 with a voltage input 408 that is multiplied with a value that depends upon the contribution to summing junction 416 by capacitor C1. Capacitor C1 begins charging when the normal output of latch 422 is high, and discharges when the normal output is low. The normal output of latch 422 transitions to a high state upon a rising edge of a pulse being delivered to the S input of latch 422. The pulse input, provided by comparator 420, marks a beginning of a cycle for phase P1. The output of comparator 420 is a pulse due to the feedback from capacitor 404 being applied to the inverting input of comparator 420, the non-inverting input being tied to ground, or zero potential. Accordingly, when capacitor 404 discharges to just below zero, comparator 420 changes state to provide a high level output to the S input of latch 414, thereby turning off switched current supply 406, and permitting capacitor 404 to charge with current source 402. As capacitor 404 charges, the voltage applied to the inverting input of comparator 420 rises above zero, causing the output of comparator 420 to transition to a low state, thereby establishing a pulse marking the beginning of the cycle for phase P1.

The pulse applied to the S input of latch 422 causes the normal output to transition to a high state, thereby charging capacitor C1. Capacitor C1 continues to charge until the rising edge of a pulse provided by comparator 446 is applied to the R input of latch 422 to reset the normal output to a low state, thereby permitting capacitor C1 to discharge. The separation of the rising edges of the pulses output from comparators 420 and 446 represents the phase difference between phases P1 and P2. Accordingly, the charge placed on capacitor C1 similarly represents the phase difference between phases P1 and P2.

If the phase difference, i.e., an operating phase difference, between phases P1 and P2 increases, a greater charge is placed on capacitor C1 than when phases P1 and P2 have a desired phase separation. The larger charge placed on capacitor C1 contributes to increasing the value supplied by summing junction 416 to multiplier 410, so that the output of multiplier 410 has a ramped output. The ramped output applied to the inverting input of comparator 412 produces a longer time interval before comparator 412 produces a pulse output to the R input of latch 414 to change the state of the inverted output of latch 414 to begin the discharge portion of the cycle of phase P1. By extending the charging portion of the cycle of phase P1, the period of the cycle for phase P1 is increased, thereby reducing the phase difference between phases P1 and P2.

Similarly, if the phase difference between phases P1 and P2, i.e., an operating phase difference, is smaller than the desired phase difference, a smaller charge is placed on capacitor C1. The smaller charge on capacitor C1 causes the output of multiplier 410 to ramp down, and comparator 412 produces a pulse output to the R input of latch 414 earlier than occurred in a previous cycle of phase P1. The earlier initiation of the discharge portion of the cycle of phase P1 shortens the period of the cycle for phase P1, thereby increasing the phase difference between phases P1 and P2.

The above-described operation of controlling a phase difference between phases P1 and P2 also applies to controlling the phase difference between phases P2 and P3, and between phases P3 and P1. Accordingly, if each of oscillators 1, 2 and 3 has different frequencies when free running, by matching a phase difference between each of phases P1, P2 and P3, the frequencies of oscillators 1, 2 and 3 tend to change toward a frequency representative of an average of the free running frequencies produced by oscillators 1, 2 and 3. Indeed, power converter 500 shows differing values for each of capacitors 404, 430 and 454, to ensure each phase has a free running frequency that is different from those of the other phases. The synchronization of the three phases to a single frequency illustrates how the concept of the present invention operates to cover a broad range of frequency capture.

Another way to view the control mechanism for phases P1, P2 and P3, is to note that manipulation of the peak values reached during the charging portion of the cycle for each phase is adjusted to modify the cycle period, and therefore the phase difference between the phases.

FIG. 6 shows an exemplary timing diagram of another embodiment, i.e., the power converter 400, of the present invention. The horizontal axis shows time. The vertical axis shows voltages for phases P1, P2, output voltage $V_{out}$, feedback voltages, $V_{f1}$, $V_{f2}$, voltages $V_{p1}$, $V_{p2}$, and outputs at multipliers 322 and 356. A person having an ordinary skill in the art would appreciate that a similar timing diagram can be drawn for a power converter having three or more phases.

Figure 7A:
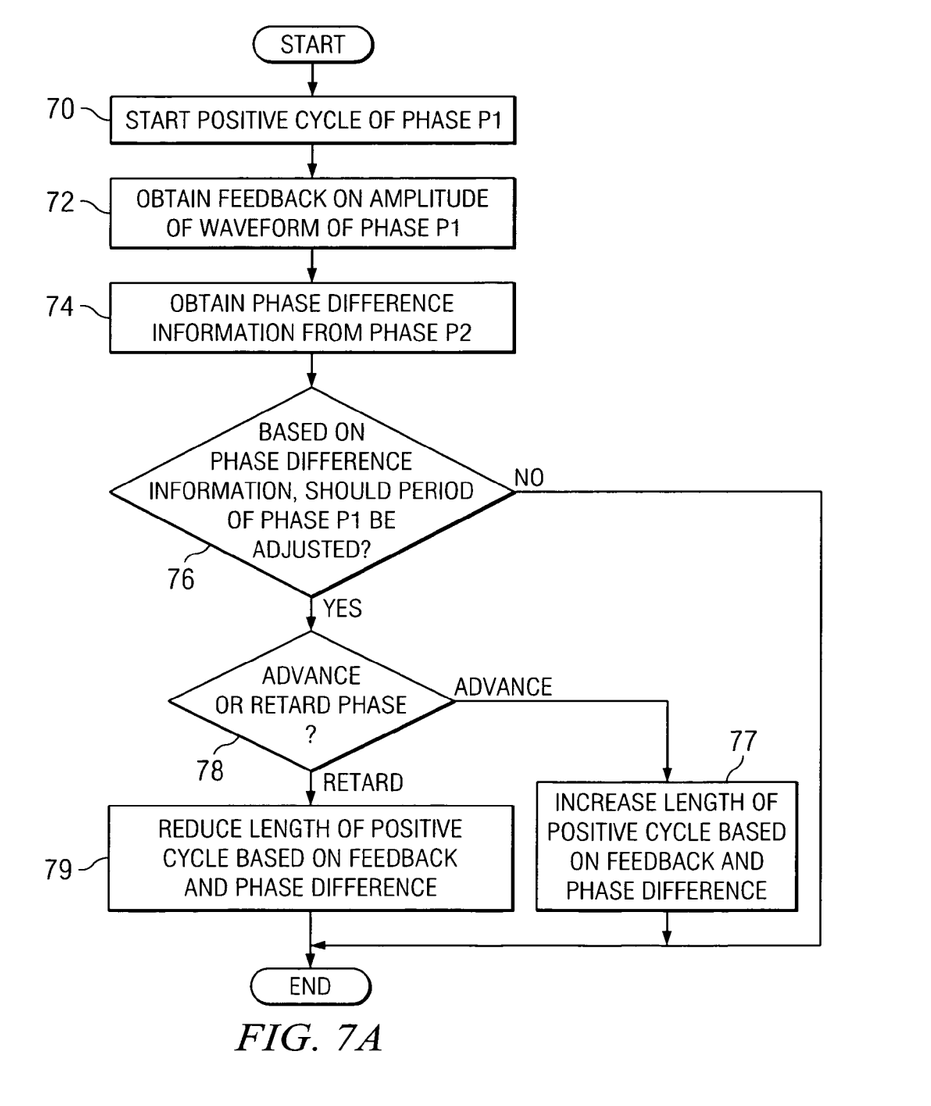
FIG. 7A shows a flowchart of a method of retarding or advancing the phase of a periodic waveform.

FIG. 7A shows an exemplary flowchart describing the steps and decisions for advancing or retarding the phase angle of phase P1. On the start of a positive cycle of phase P1, as indicated in block 70, a feedback is obtained on the amplitude of phase P1 in block 72. Phase difference information is obtained from the other phase, i.e., phase P2 in block 74. Block 76 indicates that no phase adjustment is done if the measured phase difference between phase P1 and phase P2 is negligibly different from the desired phase difference. However, in the case a phase adjustment is desirable, as indicated in the YES branch of decision block 76, decision block 78 determines whether the phase should be advanced or retarded. If the phase angle of phase P1 should advance, the length of the positive cycle of phase P1 is increased, as indicated in block 77. Similarly, if the phase angle of phase P1 should be retarded, the length of the positive cycle of phase P1 is reduced, as indicated in block 79. A person having an ordinary skill in the art would appreciate that similar steps and decisions can be taken for phase P2 with respect to phase P1.

Figure 7B:
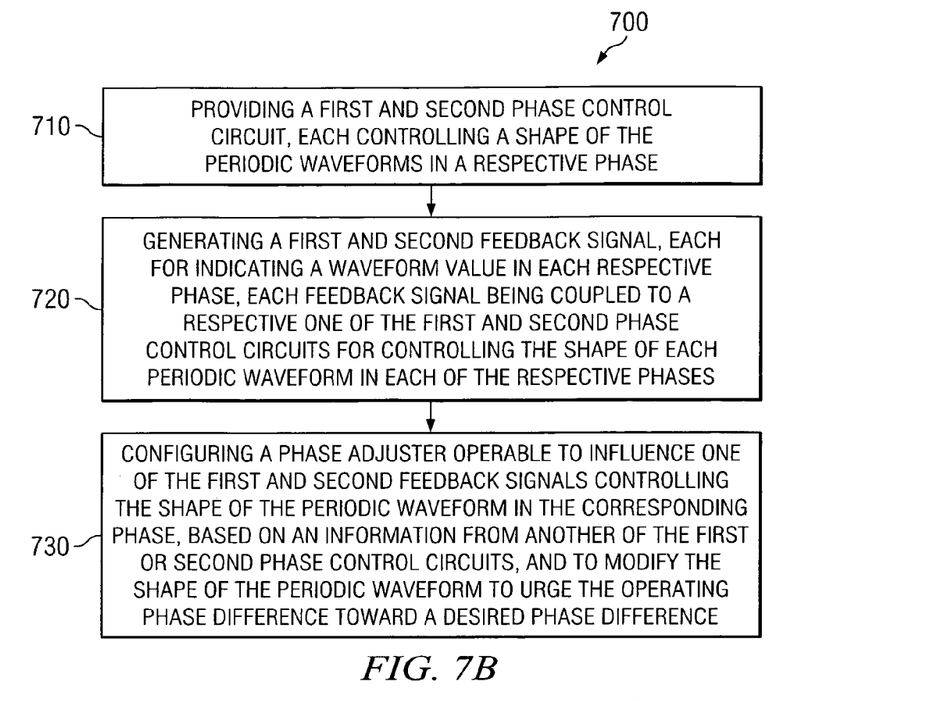
FIG. 7B shows a flowchart of a method for implementing a two-phase power converter according to another embodiment of the present invention.

FIG. 7B shows a flowchart of a method 700 for implementing a two-phase power converter according to another embodiment of the present invention. Step 710 is a step for providing a first and second phase control circuit, each controlling a shape of the periodic waveforms in a respective phase. Step 720 is a step for generating a first and second feedback signal, each for indicating a waveform value in each respective phase, each feedback signal being coupled to a respective one of the first and second phase control circuits for controlling the shape of each periodic waveform in each of the respective phases. Step 730 is a step for configuring a phase adjuster operable to influence one of the first and second feedback signals controlling the shape of the periodic waveform in the corresponding phase. The influence provided by the phase adjuster is based on information from another of the first or second phase control circuits. The phase adjuster contributes to modifying the shape of the periodic waveform to urge the operating phase difference toward a desired phase difference.

The method 700 may further include a step of keeping the operating phase difference and the desired phase difference each in a range of 0° through 180°. To achieve a desired degree of stable operation, the method 700 may include a step of configuring a phase adjuster by further including a step of locating at least one of a pole and a zero related to at least one of the first and second feedback signals. In order to avoid undesired states of operation of an SR latch, for example, in the method 700, a step of configuring a phase adjuster may further include a step of including an input having an adjustable time delay. The step of configuring the phase adjuster may further include a step of providing a reference, such as a reference voltage, that has a value that is related to the number of phases. The reference value contributes to determining the appropriate amount of control adjustment provided to the first and second feedback signals. According to an exemplary embodiment, the reference is a voltage value derived from the relationship (n−1)/n, where n is the number of phases. Thus in an exemplary case of two phases, the reference voltage will be (2−1)/2=0.5V. The step of configuring a phase adjuster may further include a step of lowering a ripple of at least one of the first and second feedback signals, for example, by appropriate filtering with an RC network.

The exemplary embodiment of method 700 includes a step of inductively generating the periodic waveforms and a step of generating the first and second feedback signals. A detected phase angle difference contributes to proportioning the feedback signal between a charge duration and a discharge duration of one of the periodic waveforms. The detected phase angle difference is based on a duration between a first instant having one of a zero slope and a discontinuity in one periodic waveform, and a second instant having one of a zero slope and a discontinuity in the other periodic waveform. A zero slope may be found in a continuous waveform and a discontinuity may be found in a non-periodic or discontinuous waveform.

Figure 8:
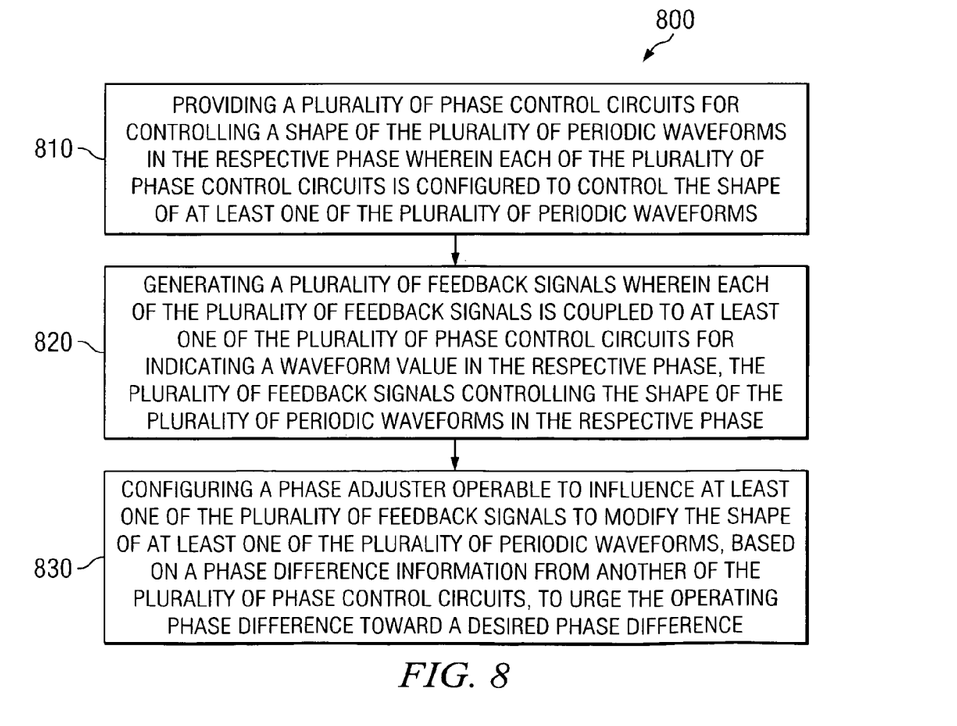
FIG. 8 shows a flowchart of a method for implementing a three-phase power converter according to another embodiment of the present invention.

FIG. 8 shows a flowchart of a method 800 for implementing a three-phase power converter according to another embodiment of the present invention. Step 810 is a step for providing a plurality of phase control circuits, each controlling a shape of the periodic waveforms in a respective phase. Step 820 is a step for generating a plurality of feedback signals, each for indicating a waveform value in each respective phase, each feedback signal being coupled to a respective one of the first and second phase control circuits for controlling the shape of each periodic waveform in each of the respective phases. Step 830 is a step for configuring a phase adjuster operable to influence one of the feedback signals controlling the shape of the periodic waveform in the corresponding phase, based on information from another of the phase control circuits, and to modify the shape of the periodic waveform to urge the operating phase difference toward a desired phase difference.

The method 800 may further include a step of keeping the operating phase difference and the desired phase difference each in a range of 0° through 120°. To achieve a desired degree of stable operation, the method 800 may include a step of configuring a phase adjuster by further including a step of locating at least one of a pole and a zero related to at least one of the first and second feedback signals. In order to avoid undesired states of operation of an SR latch, for example, in the method 800, a step of configuring a phase adjuster may further include a step of including an input having an adjustable time delay. The step of configuring the phase adjuster may further include a step of delivering a reference, such as a reference voltage, that has a value that is related to the number of phases. The reference value contributes to determining the appropriate amount of control adjustment provided to the feedback signals. According to an exemplary embodiment, the reference is a voltage value derived from the relationship (n−1)/n, where n is the number of phases. Thus in the exemplary case of three phases, the reference voltage will be (3−1)/3=0.667V. The step of configuring a phase adjuster may further include a step of lowering a ripple of at least one of the first and second feedback signals, for example, by appropriate filtering with an RC network.

The exemplary embodiment of method 800 includes a step of generating the first and second feedback signals. A detected phase angle difference influences the feedback signal to control proportioning of a charge duration and a discharge duration of one of the periodic waveforms. The detected phase angle difference is based on a duration between a first instant having one of a zero slope and a discontinuity and a second instant having one of a zero slope and a discontinuity of the other periodic waveform. A zero slope may be found in a continuous waveform and a discontinuity may be found in a non-periodic or discontinuous waveform.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A power converter with two interleaved phases having periodic waveforms, the converter comprising:
    a phase detector coupled to the at least one waveform generator and operable to generate an indication of a phase angle difference between the periodic waveforms; and
    a waveform generator operable to control generation of the periodic waveforms, wherein the waveform generator being responsive to the indication to control the generation of both periodic waveforms to form a desired phase angle difference between the periodic waveforms.

2. The power converter according to claim 1, wherein:
    the phase detector is further operable to generate another indication of a phase angle difference between the periodic waveforms; and the waveform generator is responsive to the one and another indication to control the generation of respective periodic waveforms to form a desired phase angle difference between the period waveforms.

3. The power converter according to claim 1, wherein the power converter further comprises another phase detector coupled to the waveform generator and operable to generate another indication of another phase angle difference, the waveform generator being responsive to the one indication to control generation of one of the periodic waveforms and being responsive to the another indication to control generation of another of the periodic waveforms such that the desired phase angle difference is formed based on a relative relationship between the one and another periodic waveforms.

4. The power converter according to claim 1, wherein the waveform generator further comprises two waveform generators, each being responsive to the indication to generate a periodic waveform corresponding to an associated phase.

5. The power converter according to claim 1, wherein the waveform generator is operable to obtain a power factor correction (PFC) in each phase by controlling the generation of each of the respective periodic waveforms.

6. The power converter according to claim 1, wherein the waveform generator is operable to control generation of the periodic waveforms with variable switching frequency.

7. The power converter according to claim 1, wherein the power converter operates in transition mode.

8. The power converter according to claim 1, wherein the power converter further comprises a capacitor in the phase detector to contribute to producing the indication.

9. The power converter according to claim 1, wherein the power converter further comprises a counter in the phase detector to contribute to producing the indication.

10. The power converter according to claim 1, wherein the power converter further comprises a timer in the phase detector to contribute to producing the indication.

11. The power converter according to claim 1, wherein the power converter further comprises a feedback signal representative of the periodic waveform in phase and being coupled to the waveform generator to contribute to controlling generation of the periodic waveforms.

12. The power converter according to claim 1, wherein the indication of the phase angle difference contributes to proportioning one or more of a rise or fall time of the periodic waveform.

13. A power converter with a plurality of interleaved phases having periodic waveforms, the converter comprising:
waveform generator operable to provide a plurality of periodic signals to generate the periodic waveforms;
phase detector coupled to the waveform generator and operable to provide an indication of a relative time interval between cycles of at least two of the periodic signals provided by the waveform generator that are each associated with a different phase; and
the waveform generator being responsive to the indication to modify the at least two periodic signals to thereby modify the generation of the periodic waveforms such that the periodic waveforms have a desired phase angle difference.

14. The power converter according to claim 13, wherein:
the phase detector is further operable to provide another indication of a relative time interval between cycles of the at least two periodic signals; and
the waveform generator is responsive to the one and another indication to modify respective ones of the at least two periodic signals to thereby modify the generation of the period waveforms.

15. The power converter according to claim 13, wherein the power converter further comprises at least another phase detector coupled to the waveform generator and operable to provide another indication of another relative time interval between cycles of the at least two periodic signals, the waveform generator being responsive to the one indication to modify one of the periodic signals and being responsive to the another indication to modify another of the periodic signals such that the periodic waveforms have a desired phase angle difference based on a relative relationship between the one and another periodic signals.

16. The power converter according to claim 13, wherein the waveform generator further comprises two waveform generators, each being responsive to the indication to provide a periodic signal to generate a periodic waveform corresponding to an associated phase.

17. The power converter according to claim 13, wherein the waveform generator is operable to obtain a power factor correction (PFC) in each phase by controlling the provision of each of the respective periodic signals.

18. The power converter according to claim 13, wherein the waveform generator is operable to control provision of the periodic signals with variable switching frequency.

19. The power converter according to claim 13, wherein the power converter operates in transition mode.

20. The power converter according to claim 13, wherein the power converter further comprises a capacitor in the phase detector to contribute to providing the indication.

21. The power converter according to claim 13, further comprising a counter in the phase detector to contribute to providing the indication.

22. The power converter according to claim 13, wherein the power converter further comprises a timer in the phase detector to contribute to providing the indication.

23. The power converter according to claim 13, wherein the power converter further comprises a feedback signal representative of the periodic waveform in at least one phase and being coupled to the waveform generator to contribute to controlling provision of the periodic signals.

24. The power converter according to claim 13, wherein the indication contributes to proportioning one or more of a rise or fall time of the periodic waveforms.

25. A method of power conversion for a power converter with a plurality of interleaved phases having periodic waveforms, the method comprising:
generating a plurality of periodic signals to form the periodic waveforms;
obtaining an indication of a relative time interval between cycles of at least two of the periodic signals that are each associated with a different phase; and
modifying the at least two periodic signals responsive to the indication to thereby modify the generation of the periodic waveforms such that the periodic waveforms have a desired phase angle difference.

26. The method according to claim 25, wherein the method further comprises:
obtaining another indication of another relative time interval between cycles of the at least two periodic signals; and
modifying one of the at least two periodic signals responsive to the one indication and modifying another of the at least two periodic signals responsive to the another indication such that the periodic waveforms have a desired phase angle difference based on a relative relationship between the one and another periodic signals.

27. The method according to claim 25, wherein the method further comprises obtaining a power factor correction (PFC) in each phase by controlling the generating of each of the respective periodic signals.

28. The method according to claim 25, wherein the method further comprises switching the periodic signals at a variable frequency to form the periodic waveforms.

29. The method according to claim 25, wherein the method further comprises operating the power converter in transition mode.

30. The method according to claim 25, wherein the method further comprises using a capacitor to contribute to obtaining the indication.

31. The method according to claim 25, wherein the method further comprises using a counter to contribute to obtaining the indication.

32. The method according to claim 25, wherein the method further comprises using a timer to contribute to obtaining the indication.

33. The method according to claim 25, wherein the method further comprises:

obtaining a feedback signal representative of the periodic waveform in at least one phase; and influencing generating a corresponding periodic signal with the feedback signal.

34. The method according to claim 25, wherein the indication contributes to proportioning one or more of a rise or fall time of one or more of the periodic waveforms.

* * * * *